United States Patent
Alberti (10) Patent No.: US 7,192,172 B1
(45) Date of Patent: Mar. 20, 2007

(54) VISUAL WARNING DEVICE

(75) Inventor: Thomas P. Alberti, Port Washington, WI (US)

(73) Assignee: K.W. Muth Company, Inc., Sheboygan, WI (US)

( * ) Notice: Subject to any disclaimer, the term of this patent is extended or adjusted under 35 U.S.C. 154(b) by 0 days.

(21) Appl. No.: 11/222,423

(22) Filed: Sep. 8, 2005

(51) Int. Cl.
*B60Q 3/04* (2006.01)

(52) U.S. Cl. .................. 362/543; 362/259; 362/494

(58) Field of Classification Search ............... 362/543, 362/494, 442, 259
See application file for complete search history.

(56) References Cited

U.S. PATENT DOCUMENTS

| | | | |
|---|---|---|---|
| 3,866,032 A * | 2/1975 | Veres | 362/259 |
| 3,949,362 A | 4/1976 | Doyle et al. | |
| 5,014,167 A * | 5/1991 | Roberts | 362/494 |
| 5,355,284 A | 10/1994 | Roberts | |
| 5,719,568 A | 2/1998 | Adams | |
| 5,923,243 A | 7/1999 | Bleiner | |
| 6,005,724 A | 12/1999 | Todd | |
| 6,588,115 B1 * | 7/2003 | Dong | 33/227 |
| 6,682,210 B1 * | 1/2004 | Ford et al. | 362/493 |
| 6,690,268 B2 * | 2/2004 | Schofield et al. | 340/438 |
| 6,733,134 B2 | 5/2004 | Bleiner | |
| 2003/0169160 A1 * | 9/2003 | Rodriguez Barros et al. | 340/426.1 |
| 2003/0227779 A1 * | 12/2003 | Boddy et al. | 362/494 |
| 2004/0080958 A1 * | 4/2004 | Bukosky et al. | 362/494 |
| 2005/0169003 A1 * | 8/2005 | Lindahl et al. | 362/494 |
| 2005/0237757 A1 * | 10/2005 | Weng | 362/494 |

\* cited by examiner

*Primary Examiner*—Renee Luebke
*Assistant Examiner*—Julie A. Shallenberger
(74) *Attorney, Agent, or Firm*—Wells St. John P.S.

(57) ABSTRACT

A visual warning device is disclosed and which includes an emitter of visibly discernible light positioned in spaced relation relative to an underlying supporting surface, and which, when energized, emits visibly discernible light which is projected onto the underlying supporting surface to identify a restricted region which is positioned in spaced relation relative to the emitter.

15 Claims, 11 Drawing Sheets

VISUAL WARNING DEVICE

TECHNICAL FIELD

The present invention relates to a visual warning device, and more specifically to a warning device which includes an emitter which projects visible light forming a pattern onto an underlying supporting surface to identify a restricted region which is positioned adjacent to the emitter.

BACKGROUND OF THE INVENTION

The prior art is replete with numerous examples of prior art visual signaling devices of various types and which can be utilized on overland vehicles and other assemblies and which, for example, are useful for signaling adjacent drivers regarding a change in the operational status of the overland vehicle. Such signaling devices, as disclosed in U.S. Pat. Nos. 6,005,724; 5,014,167 and 5,355,284, for example, have found a wide degree of commercial acceptance and have been successfully installed and operated on overland vehicle platforms of various designs for a number of years.

As seen in U.S. Pat. Nos. 6,733,134; and 5,923,243, the teachings of which are incorporated by reference herein, other inventors have attempted to provide various visual signaling devices on overland vehicle platforms, and which have been useful for projecting a light which may form a design either forwardly, or rearwardly of the overland vehicle for various purposes including collision avoidance. Another example of a warning apparatus for an overland vehicle is seen in U.S. Pat. No. 3,949,362, the teachings of which are also incorporated by reference herein. In that reference, a signal emitter comprising a lamp emits a visible light beam rearwardly of the overland vehicle and towards the roadway to indicate a safe stopping distance for an overland vehicle which is traveling therebehind. In some forms of this invention, a signal detector may be provided on the trailing vehicle to detect the energy beam from the lead vehicle.

A visual warning device which provides many advantages over the prior art devices and practices utilized heretofore is the subject matter of the present application.

SUMMARY OF THE INVENTION

A first aspect of the present invention relates to a visual warning device which includes an emitter of visibly discernible light positioned in spaced relation relative to an underlying supporting surface, and which, when energized, emits visibly discernible light which is projected onto the underlying supporting surface to identify a restricted region which is positioned in adjoining, spaced relation relative to the emitter.

Another aspect of the present invention relates to a visual warning device for an overland vehicle which includes a mirror housing borne by the overland vehicle, and which defines an aperture and an internal cavity; a first emitter of visibly discernible light mounted within the cavity, and which, when energized, emits visibly discernible light; a second emitter of visibly discernible light mounted within the cavity, and which, when energized emits visibly discernible light; and a semitransparent mirror borne by the mirror housing and which substantially occludes the aperture, and wherein the visible light emitted by the first emitter passes through the semitransparent mirror and travels laterally outwardly relative to the overland vehicle, and the visible light emitted by the second emitter passes out of the mirror housing and travels laterally outwardly and downwardly relative to the overland vehicle to project a visibly discernible geometric figure onto an underlying supporting surface which is adjacent to the overland vehicle.

Still further, another aspect of the present invention relates to a visual warning device for an overland vehicle which includes a mirror housing borne by the overland vehicle and which defines an aperture, and an internal cavity; a semitransparent mirror borne by the mirror housing and which substantially occludes the aperture; a first emitter of visibly discernible light mounted in the cavity of the mirror housing, and wherein the visibly discernible light of the first emitter, when energized, passes through the semitransparent mirror, and travels predominately laterally outwardly and rearwardly of the overland vehicle, and in a substantially parallel orientation relative to an underlying supporting surface, so as to be seen at a distance beyond the length of the overland vehicle; a second emitter of visibly discernible light mounted in the cavity of the mirror housing, and wherein the visibly discernible light of the second emitter passes out of the mirror housing and travels predominately laterally outwardly and downwardly onto the underlying supporting surface, and wherein the visibly discernible light of the second emitter forms a visibly discernible geometric figure on the underlying supporting surface, and wherein the geometric figure has a length dimension which is less than about four times the length dimension of the overland vehicle; and a third emitter of visibly discernible light mounted in the cavity of the mirror housing, and wherein the visibly discernible light of the third emitter passes out of the mirror housing, and illuminates a region adjacent to the overland vehicle during reduced periods of visibility and/or ambient light to assist an operator of the overland vehicle when entering or existing the overland vehicle.

These and other aspects of the present invention will be discussed in greater detail hereinafter.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
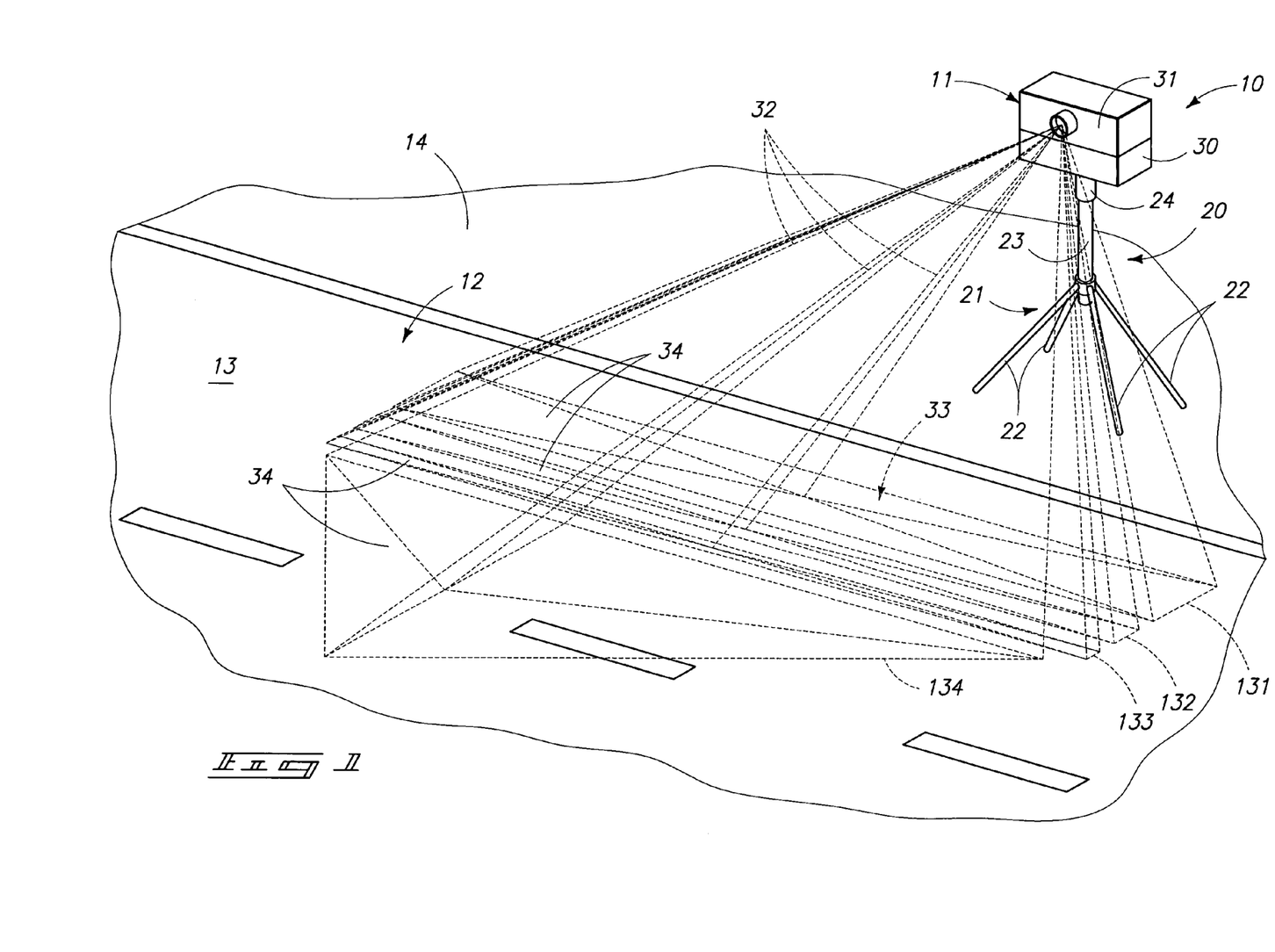
FIG. 1 is a perspective, environmental view of a first form of the visual warning device of the present invention.

The visual warning device of the present invention is generally indicated by the numeral 10 in FIG. 1, and following. As seen in FIG. 1, a first form of the present invention 11 is illustrated in an environmental view, and where it is positioned in spaced relation relative to an underlying supporting surface which is generally indicated by the numeral 12. The underlying supporting surface as depicted herein includes a roadway for an overland vehicle which will be discussed in greater detail hereinafter, and a shoulder portion 14, which is adjacent thereto. As seen in FIG. 1, the first form 11 of the present invention 10 includes a deployable support assembly, and which is generally indicated by the numeral 20. This deployable support assembly includes a base portion 21 which has a plurality of earth engaging legs 22 which rest on the underlying supporting surface such as on the shoulder 14. Mounted to the base portion 21 is a selectively extendible mast 23 having a distal end 24. The mast is designed to be extended to a given height above the underlying supporting surface 12. Mounted on the distal end of the mast is a power supply such as a conventional battery 30. The power supply 30 is operable to provide electrical power for energizing an emitter of visibly discernable light 31, as will be discussed in greater detail hereinafter. The emitter which is chosen for this first form of the invention may comprise, for example, an eye-safe laser, or a light emitting diode. Still further, the emitter may include other assemblies such as, for example, a control unit which will be discussed, hereinafter. The invention 10 may further include a line generator which is operably optically coupled with the emitter and which receives the visibly discernable light which is generated by the emitter; or an optical pattern generator which is operably optically coupled with the emitter, and which receives the visibly discernable light which is generated by the emitter and which projects an illuminated restricted region 33 onto the underlying supporting surface 12. Other technology such as a digital micromirror device or optical semiconductor may be employed in combination with the emitter to project all manner of different designs. The digital micromirror device may be integrally incorporated within a digital light processor. As seen in FIG. 1, the illuminated restricted region 33 is positioned in spaced relation relative to the emitter 31. The emitted or projected light 32 provided by the emitter 31 may form various geometric FIG. 34 on the underlying supporting surface 12 in order to define the restricted region 33. As will become evident from the discussion which follows with respect to the other forms of the invention, the visibly discernable light 32 may form a geometric FIG. 34 which includes alpha-numeric characters or other designs as appropriate. In the several forms of the invention which are disclosed, the emitted visibly discernable light may comprise a single color, or may comprise a plurality of discreet colors. Still further, the emitted visibly discernable light may be animated such that portions of the geometric figure may be sequentially illuminated in order to render the geometric figure more understandable or impart further information to someone viewing same. The form of the invention, as seen in FIG. 1, may be useful to law enforcement and/or emergency personnel at roadside accident sites and the like. In this first form of the invention 11, emergency personnel would position the first form of the invention 11 on the shoulder 14 so as to create an illuminated geometric FIG. 34 in the form of an animated arrow which would direct motorists to move to an adjacent lane for purposes of avoiding an accident, congestion, or other difficulties in the lane which is immediately adjacent to the shoulder. As should be understood, the emitter 31 is typically energized during periods of darkness in order to create a visibly discernable geometric FIG. 34 that can be viewed by an operator of an approaching overland vehicle who is traveling on the roadway 13.

Figure 2:
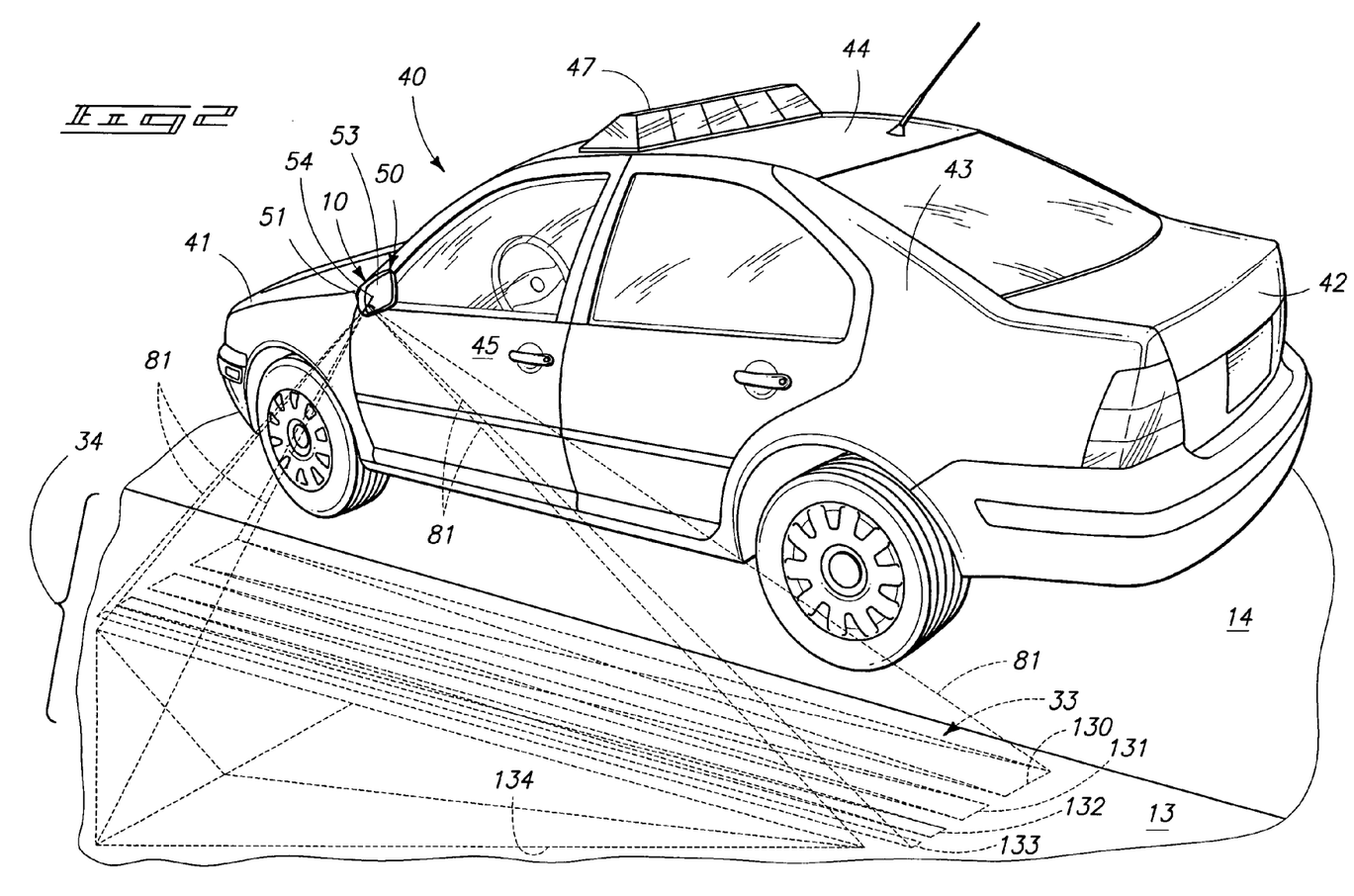
FIG. 2 is a perspective, environmental view of a second form of the visual warning device of the present invention and which is shown mounted on an emergency and/or law enforcement vehicle.

Referring now to FIG. 2, an overland vehicle is shown, and is illustrated as an emergency and/or law enforcement vehicle, and which is generally indicated by the numeral 40. The overland vehicle 40 has a first or front end 41; a second or rear end 42; and a main body 43, which is fitted upon a chassis. Still further, the main body has a roof 44, and driver and passenger doors 45 and 46, respectively, and which allows an operator or passenger (not shown) to enter or exit the overland vehicle 40. As depicted in FIG. 2, the overland vehicle 40 is stopped, and parked on the shoulder 14, and which is adjacent to the roadway 13. As depicted in FIG. 2, and following, the overland vehicle 40 which is here depicted as an emergency and/or law enforcement vehicle 40, has mounted on its roof 44 emergency lights 47 and other equipment which is well known in the art.

Figures 10, 11, 12, 13:
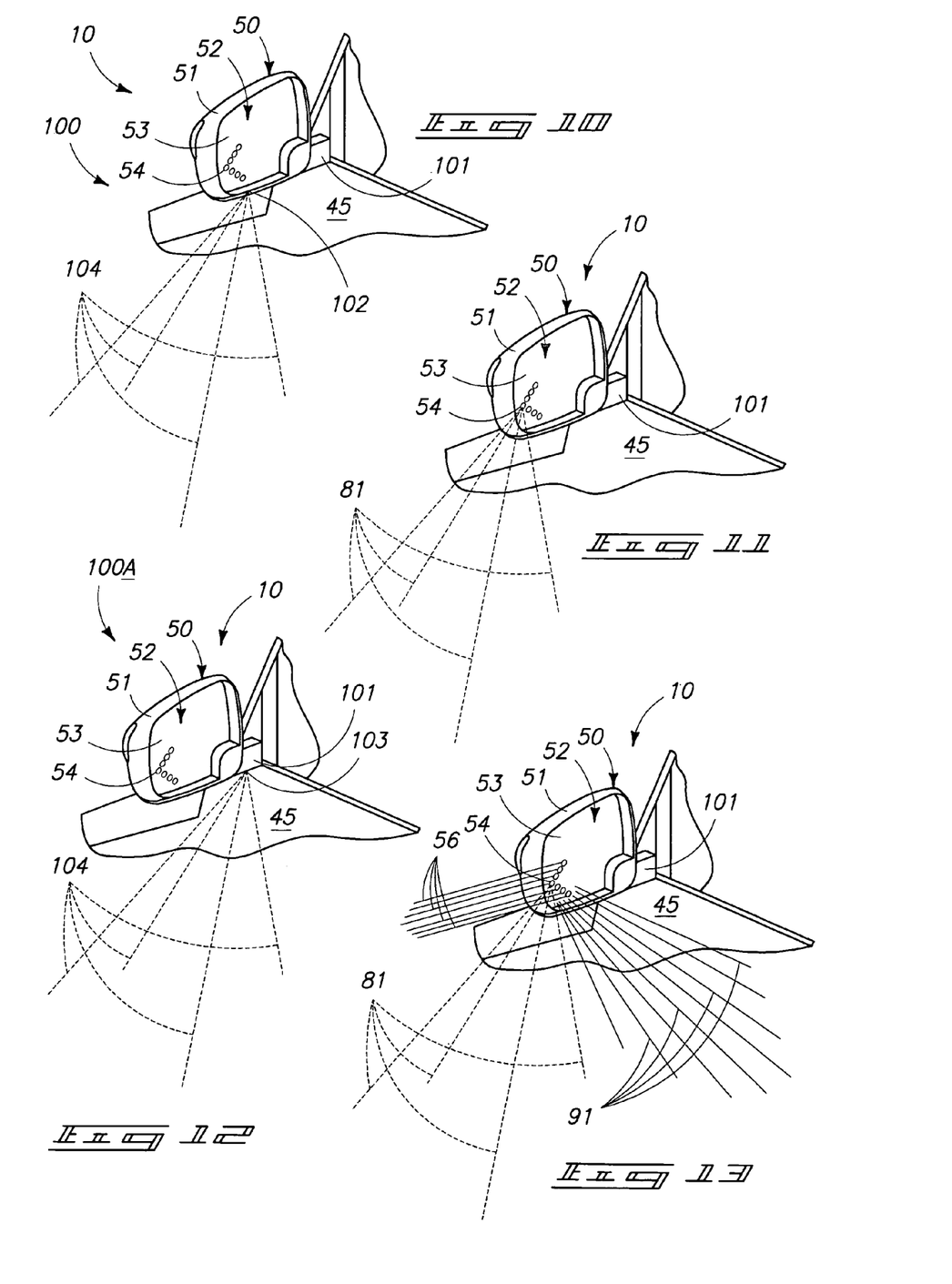
FIG. 10 is an enlarged, perspective, side elevation view of a fifth form of the visual warning device of the present invention.
FIG. 11 is an enlarged, perspective, side elevation view of the second form of the visual warning device of the present invention.
FIG. 12 is an enlarged, perspective, side elevation view of a sixth form of the visual warning device of the present invention.
FIG. 13 is an enlarged, perspective, side elevation view of a visual warning device of the present invention and showing the several visually discernable beams of light emitted by same.

Still referring to FIG. 2, and further by reference to FIG. 11, the overland vehicle 40 includes, as seen in those views, a second form 50 of the visual warning device 10, and which is made integral with a rearview mirror. The second form of the invention 50 has some structural and operational features which are similar to the visual signal apparatus that is shown in U.S. Pat. No. 6,005,724, the teachings of which are incorporated by reference herein. The second form of the invention 50 includes a mirror housing 51 which defines an internal cavity 52. Still further, a semitransparent mirror 53 substantially occludes the cavity, and allows the operator of the overland vehicle 40 to view regions rearwardly of the overland vehicle. The semitransparent mirror 53 includes a region 54 through which visible light may pass. In the arrangement as seen in U.S. Pat. No. 6,005,724 and others, and referring to FIG. 14, a first emitter of visible light 55 is positioned in the cavity 52, and is operable to emit visible light 56 which passes through the region 54 and travels predominately laterally, outwardly relative to the overland vehicle 40, and in substantially parallel spaced relation relative to the underlying supporting surface 12. The first emitter 55 transmits the light 56 beyond the length of the overland vehicle 40 so that it may be seen by the operators of other overland vehicles which are traveling rearwardly and adjacent to the overland vehicle 40 as shown. Typically, this light may be seen at distances of up to several hundred meters away. The pattern of the emitted light 56 of the first emitter 55 is shown most clearly by reference to FIGS. 3 and 4, respectively. The benefits of utilizing a visual signaling device such as shown in U.S. Pat. No. 6,005,724 are well established. The operation of such visual signaling devices are also well understood and further discussion regarding their operation and construction is not warranted. As should be understood, the semitransparent mirror 53 which is utilized with the present invention 50 may be selected from the group comprising electrochromic, dichroic, and substantially neutrally chromatic mirrors.

Figure 14:
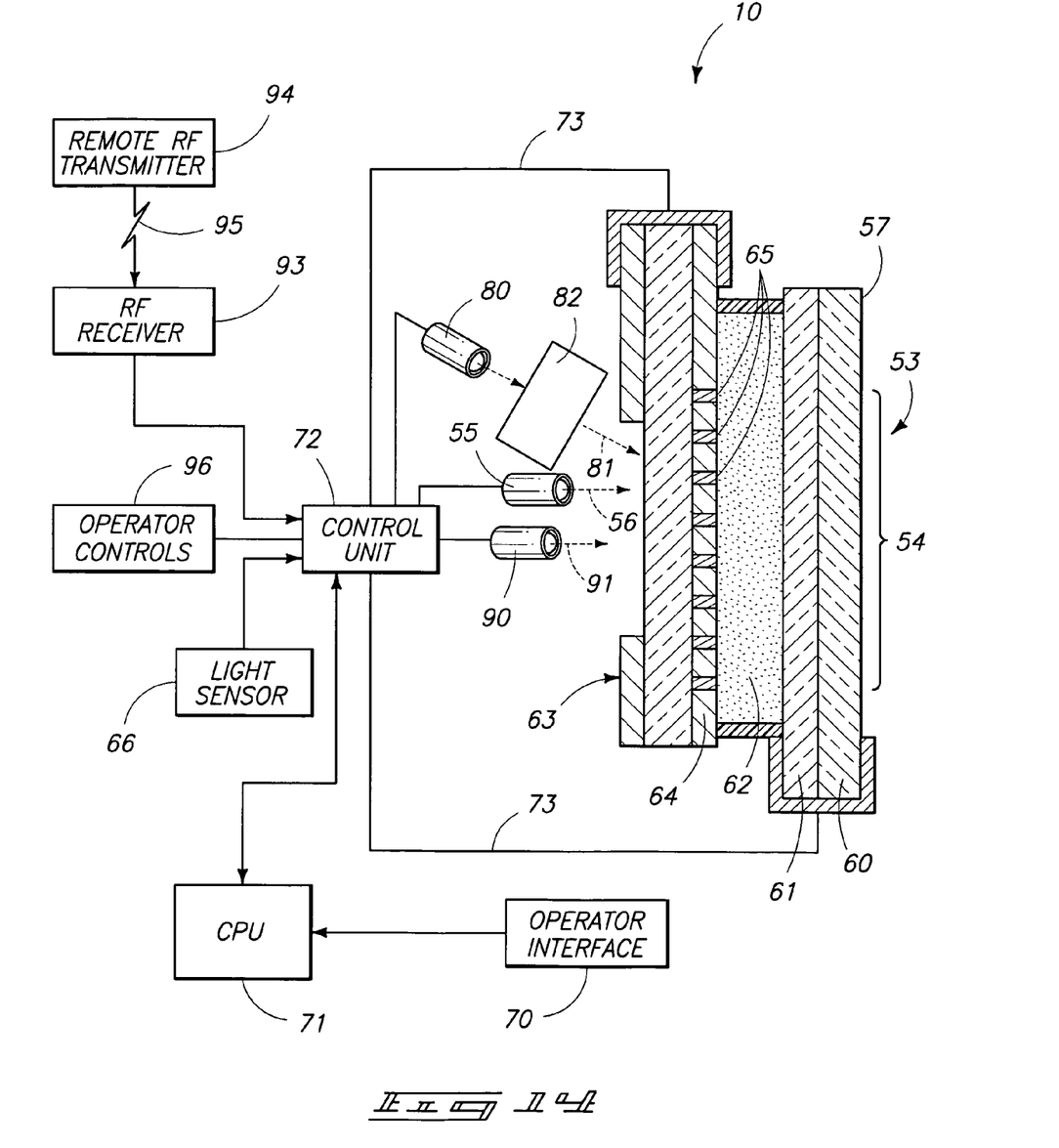
FIG. 14 is a greatly simplified schematic view of one form of the visual warning device of the present invention.

In the arrangement as seen in FIG. 14, the present invention is illustrated in a simplified fashion with respect to a semitransparent mirror 53, here depicted as an electrochromic mirror 57. The construction of electrochromic mirrors are well understood in the art. As a general matter these mirrors 57 include a front or transparent element 60, and which has a rearwardly facing surface. A transparent electrically conductive material 61 is applied thereto. Still further, the electrochromic mirror includes an electrochromic fluid or gel 62 which is sandwiched between the front or transparent element 60; and a second or rear element 63 which is also rendered transparent. As seen in FIG. 14, a thin film reflector electrode 64 is positioned in spaced relation relative to the front element 60. Further, a plurality of apertures 65 are formed in this conductive thin film electrode and which permits the passage of visibly discernable light therethrough, and which forms a visibly discernable signal as might be formed when the overland vehicle is signaling while changing lanes or turning. This is seen most clearly by reference to FIGS. 3 and 4. As illustrated in FIG. 14, the electrochromic mirror 57 is typically provided with an ambient light sensor 66 which is electrically coupled to a control unit 70. The control unit 70 is electrically coupled to both the front transparent element 60, and the rear element by way of the electrical conductor 73 which are coupled to the electrically conductive material 61, and the thin film reflector electrode 64. The control unit 72 is operable to provide a source of electricity which causes the electrochromic fluid or gel 62 to change in its opaqueness thereby rendering the electrochromic mirror 57 either increasingly, or decreasingly reflective based upon the ambient lighting conditions sensed by the ambient light sensor 66. Various arrangements for transmitting light 56 through the semitransparent mirror 53 can be employed in the present invention without departing from the teachings thereof. More specifically, assemblies such as seen in U.S. Pat. No. 6,076,948 and other designs may be employed with equal success.

In the arrangement as seen in FIG. 14, it should be understood that the present invention 10 may include an operator interface 70 which is positioned within the overland vehicle 40 and which permits an operator to selectively energize the invention 10 to provide assorted, geometric FIG. 34 which are projected onto the underlying supporting surface 12. The operator interface is electrically coupled with controller 71. The controller 71 is operable to provide appropriate electrical signals to a control unit 72. As seen, the control unit 72 is coupled in electrically controlling relation relative to the electrochromic mirror 57, and is further operable to energize the several emitters of visible light, one of which is the first emitter 55. As illustrated, the ambient light sensor 66 is electrically coupled in signal transmitting relation relative to the control unit. In operation, the operator interface 70 provides a convenient means whereby an operator (not shown) can override the normal electrochromic mirror functioning characteristics in order to allow ambient light emitted by a second emitter, which will be discussed below, to pass through the electrochromic mirror so as to be projected onto the underlying supporting surface 12. As should be understood, and typically during reduced ambient lighting conditions, an electrochromic mirror will tend to become more opaque, and less reflective thereby causing less light to be reflected into an operators eyes. However, when the optional operator interface is employed, the electrochromic mirror is rendered highly transmissive of visible light, so that the present invention may operate effectively in a dark environment.

As noted above, other semitransparent mirror 53 arrangements could be used with equal success. A more common approach than that discussed, above, would be to remove reflective material from the semitransparent mirror 53 in order to define a region which permits the passage of visible light therethrough. As seen in the various views, the removal of reflective material defines a discrete visually identifiable region through which the light may pass. While this region is not as reflective as adjacent regions, on average, the semitransparent mirror has acceptable reflectivity for use on overland vehicle platforms as seen in the drawings.

As seen by a study of FIGS. 2, 11, 13 and 14, the second form of the invention 50 includes a second emitter of visibly discernable light which is generally indicated by the numeral 80. The second emitter 80 may comprise an eye-safe laser; a light emitting diode; or other similar light emitting devices. The second emitter 80, when energized, emits visibly discernable light 81 which is then transmitted through the semitransparent mirror 53, and onto the underlying supporting surface 12. As illustrated most clearly by reference to FIG. 14, and in some forms of the invention, the visual warning device 10 includes various optical assemblies or devices which are useful for forming the given geometric FIG. 34 which is projected onto the underlying supporting surface 12 which is adjacent to the overland vehicle 40 to define the restricted region 33. For example, these other assemblies may include a line generator; an optical pattern generator; or various other optical assemblies such as lenses; diffraction media; beam splitters; and/or oscillating and/or spinning mirrors; and prisms, as appropriate, to form the geometric figure on the underlying supporting surface. These well known structures are generally indicated by the box labeled 82. As should be understood, these optical or other devices receive the visibly discernable light 81 which is generated by the emitter 80 and thereafter form a projected pattern of light on the underlying supporting surface in the form of a selected geometric FIG. 34.

As best understood by a study of FIGS. 13 and 14, the second form 50 of the present invention 10 includes a third emitter of visibly discernable light, and which is generally indicated by the numeral 90. This third emitter, when energized, is operable to emit visible light 91 which is projected through the semitransparent mirror 53 to illuminate a region adjacent to the overland vehicle 40 during periods of reduced visibility or low ambient light. The third emitter 90 is typically referred to in the art as a "puddle light." The visible light, which is emitted, is typically white light. This light assists an operator or a passenger of an overland vehicle to enter or exit the vehicle during periods of darkness, for example. Typically, the visible light 91 is projected along the side of the overland vehicle 40 to illuminate the handle and the door lock for the overland vehicle 40, as well as the underlying supporting surface 12 which is immediately underneath the doors 45 and 46, respectfully. As seen in FIG. 14, the third emitter 90 is electrically coupled to the control unit 72. Still further, the overland vehicle 40 has a remote radio frequency receiver 93 mounted thereon. Typically, the operator of the overland vehicle would carry a key fob (not shown) and which includes a small radio frequency transmitter 94. The operator uses the key fob to send an RF signal 95 to the RF receiver when the operator approaches the vehicle. In the arrangement as shown, the control unit 72, upon receiving a signal from the RF receiver, is operable to energize the third emitter 90 in order to emit the visible light 91. As seen in FIG. 14, the control unit 72 is further electrically coupled with the operator controls 96 of the overland vehicle 40. Such operator controls will typically include the directional signaling switch for the overland vehicle. Upon use of the directional signaling switch by the operator, the overland vehicle is operable to provide a visible signal 97 such as what is depicted in FIG. 3 and following.

Referring now to FIGS. 10 and 12, it will be seen that the present invention 10 includes two more forms of the invention 100, and 100A respectively. In these two forms of the invention 100 and 100A, an aperture 102 or 103 is formed in either the mirror housing 51 (FIG. 10), or the mount 101 (FIG. 12) which attaches the mirror housing 51 to either of the driver or passenger doors 45 and 46, respectively. In these alternative forms, individual apertures 102 and 103 respectively formed either in the mirror housing 51; or the mount 101; permit the emitted light 104 provided by the second emitter 80 to escape therethrough and be projected in the given pattern on the underlying supporting surface 12 to form the geometric FIG. 34 which designates the restricted region 33 adjacent to the overland vehicle 40. As should be appreciated, in these alternative forms of the invention 100 and 100A, the second emitter 80 would not by necessity, need to be positioned within the mirror housing 51. Rather, the emitter 80 could, alternative be positioned remotely on the overland vehicle 40 and thereafter be optically coupled to the respective apertures 102 and 103, by means of an optical wave guide or fiber optic cable, as appropriate, and which is not shown.

Figure 3:
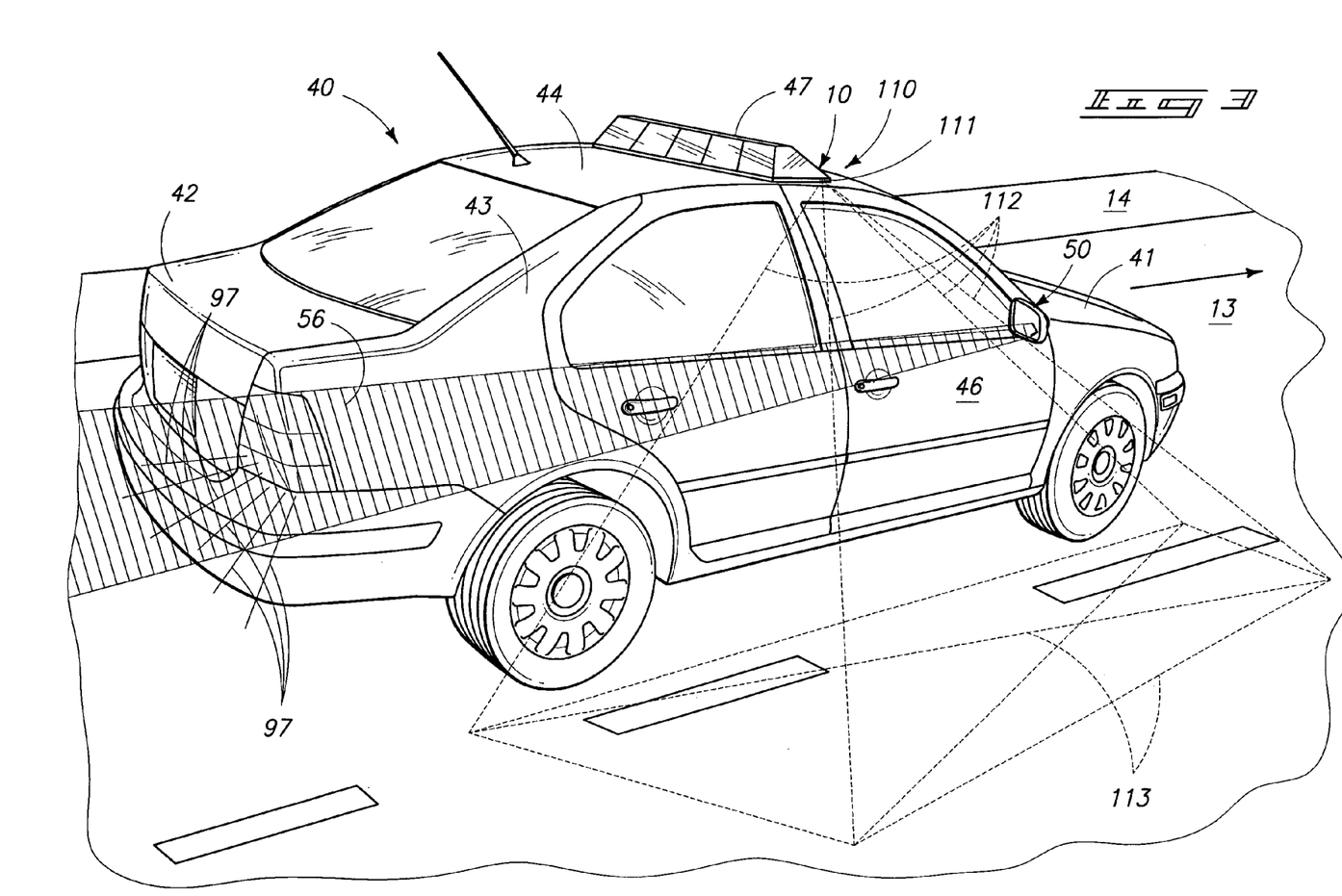
FIG. 3 is a perspective, environmental view of a third form of the visual warning device of the present invention, and which is shown mounted on an emergency and/or law enforcement vehicle.
Figure 4:
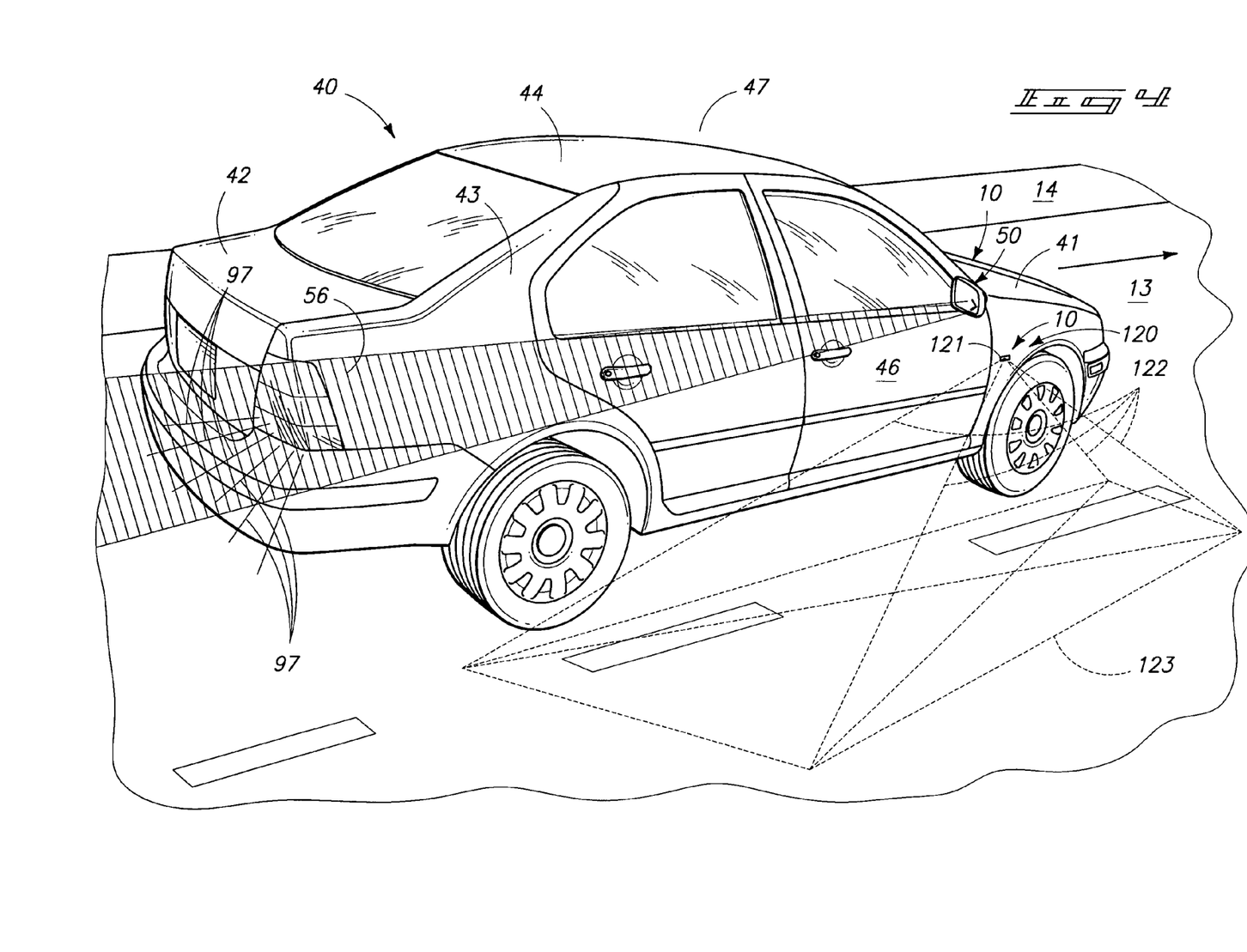
FIG. 4 is a perspective, environmental view of a fourth form of the present invention, and which is shown mounted on an overland vehicle of conventional design.

Referring now to FIG. 3, another form 110 of the invention is shown. As depicted in FIG. 4, an overland vehicle 40 is illustrated as traveling along the roadway 13 in a given direction. The overland vehicle is signaling that it is about to change lanes by means of the light 97 which is emitted from its rear lights. Further, the overland vehicle 40 is equipped with a visual warning device 50 such as earlier discussed. The invention 50, when energized, emits light 56 forming a visual signal which travels rearwardly and in a substantially parallel orientation relative to the underlying supporting surface 12 so that the visual signal may be seen by other vehicles traveling rearwardly and in adjacent lanes. In this form of the invention 110, the second emitter 111 of visibly discernable light is shown mounted on the roof 44 of the overland vehicle, and more specifically on the light bar 47. In this arrangement, the second emitter, when energized, emits light 112 which is projected onto the roadway surface 13 adjacent to the overland vehicle in order to define a restricted region 113 which is adjacent to the vehicle 40. As illustrated, the geometric figure, is depicted as a substantially rectangular box which has an "X" formed through the middle of it. The purpose of the geometric figure is to indicate to adjacent drivers that the operator is about to move into the restricted region 113 as he is beginning to change lanes. In the arrangement as shown, the restricted region 113 has a length dimension which is less than about four times the length dimension of the overland vehicle 40 and typically less than about the length of the overland vehicle 40. However, other restricted region dimensions are possible based upon the geometric figure which is selected. As earlier discussed, the geometric figure may include alpha-numeric characters, as appropriate. As illustrated, the restricted region 113, is depicted as being positioned immediately adjacent and to the side of the overland vehicle 40. In yet another alternative form of the present invention, it should be understood that the second emitter 111 may be located on an extendible mast, not shown, and which is positioned on the roof 44 of the overland vehicle 40 such that the emitter may be positioned at an elevated position relative to the roadway surface 13.

Figure 5:
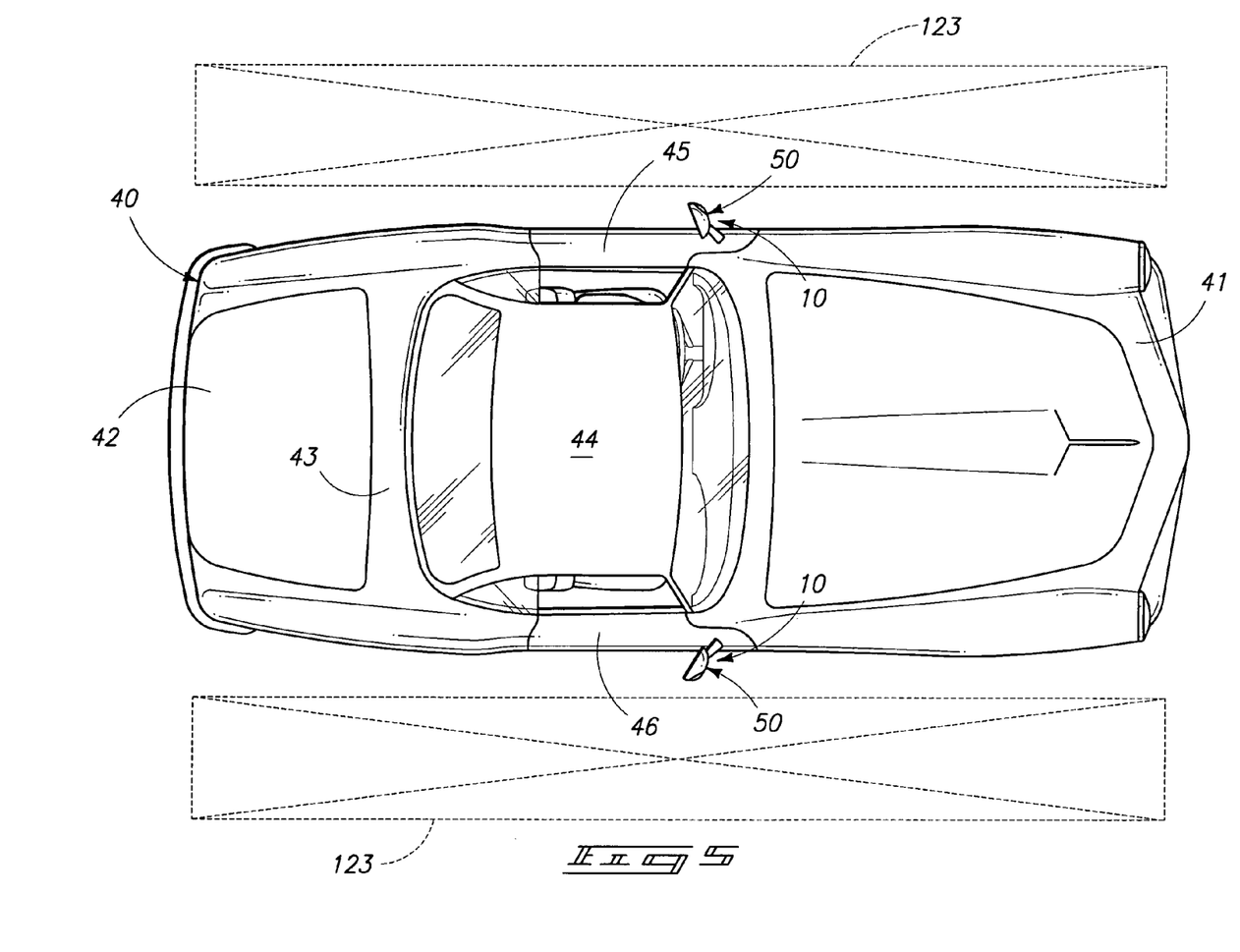
FIG. 5 is a top plan view of an overland vehicle which is equipped with the visual warning device of the present invention, and which is shown operating in a first mode.

Referring now to FIG. 4, another form of the invention is shown, and which is generally designated by the numeral 120. In this form of the invention, the second emitter 121 is mounted on the main body 43 of the overland vehicle 40. The second emitter emits visibly discernable light 122 which is again projected onto the underlying supporting surface 12 here shown as a roadway 13. As illustrated, the overland vehicle 40 is shown traveling on the roadway 13, and is about to change lanes, and is signaling the change of lanes by way of the light 97 which is emitted from the rear lights of the overland vehicle 40. As seen in that view, the emitted light 122 identifies a restricted region 123 which is adjacent to the overland vehicle 40. This restricted region would indicate to closely adjoining drivers that the overland vehicle is about to move into the restricted region which is indicated by the geometric figure. These same restricted regions 123 are again shown in the plan view, as seen in FIG. 5. As shown, the restricted region may be displayed, alternatively, on the opposite sides of the overland vehicle 40 depending upon the direction which the overland vehicle is turning.

Figure 6:
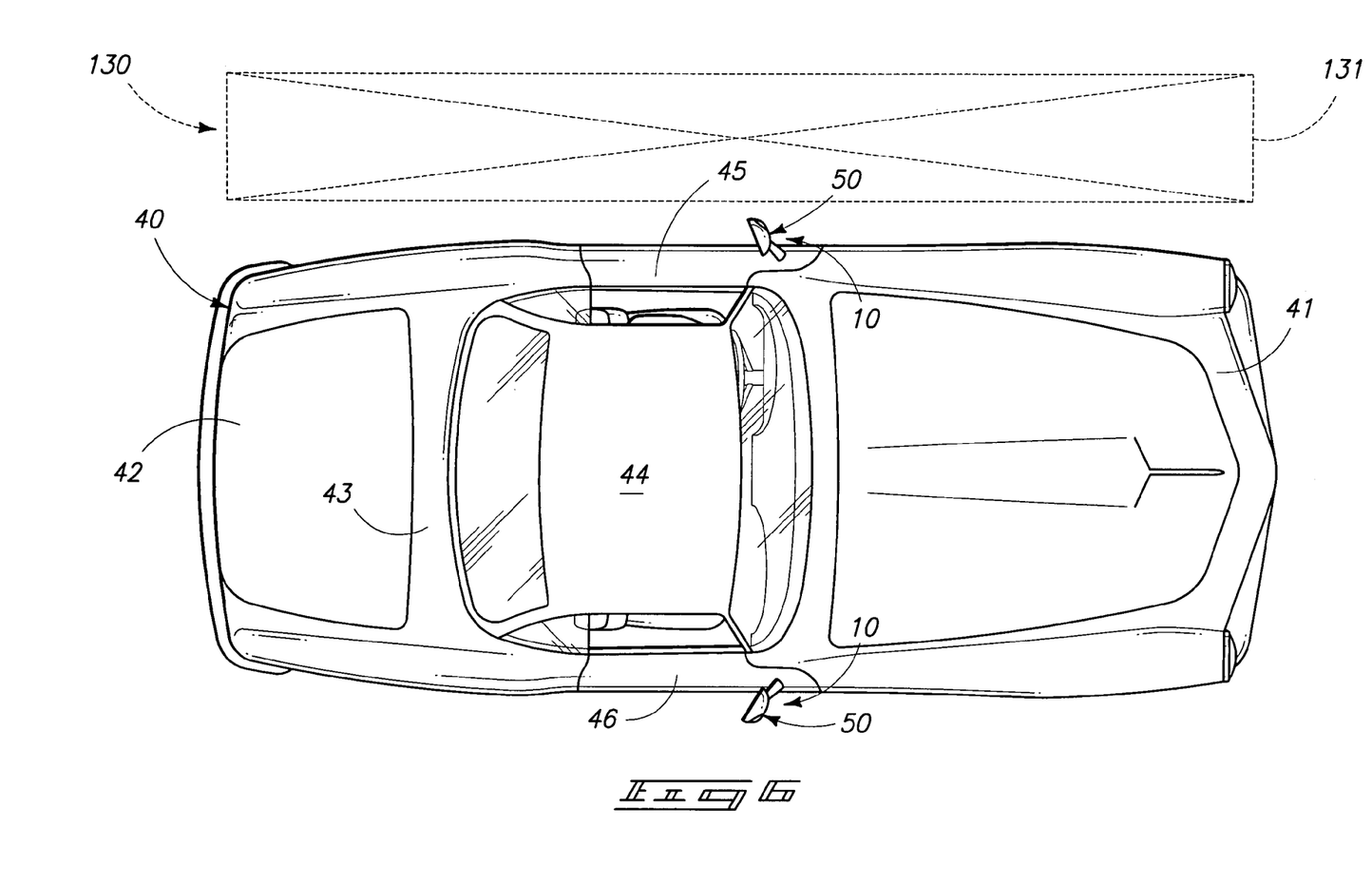
FIG. 6 is a top plan view of an overland vehicle equipped with a visual warning device of the present invention, and which is shown operating in a second mode.
Figure 7:
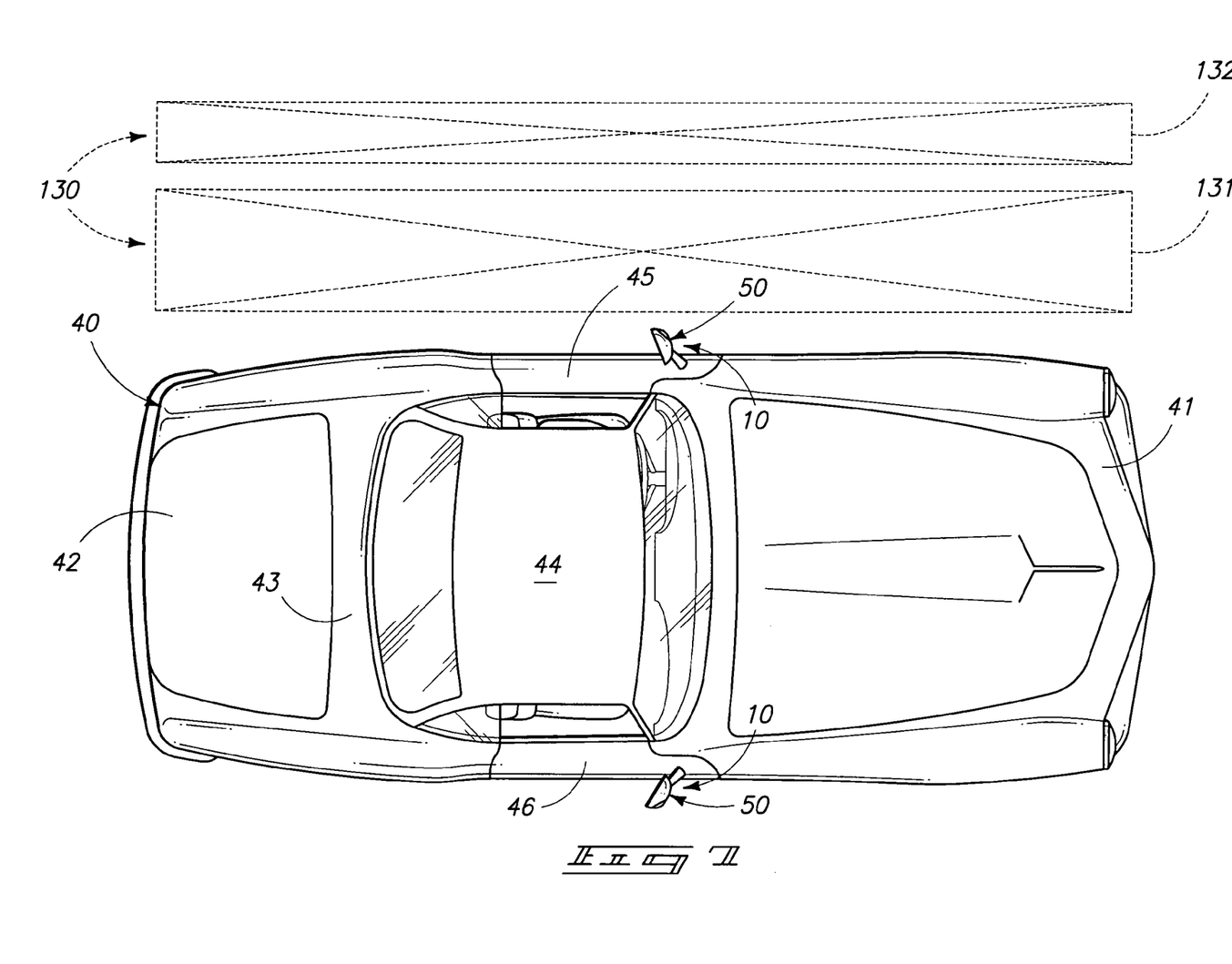
FIG. 7 is a top plan view of an overland vehicle equipped with a visual warning device of the present invention, and which is shown operating in a third mode.
Figure 8:
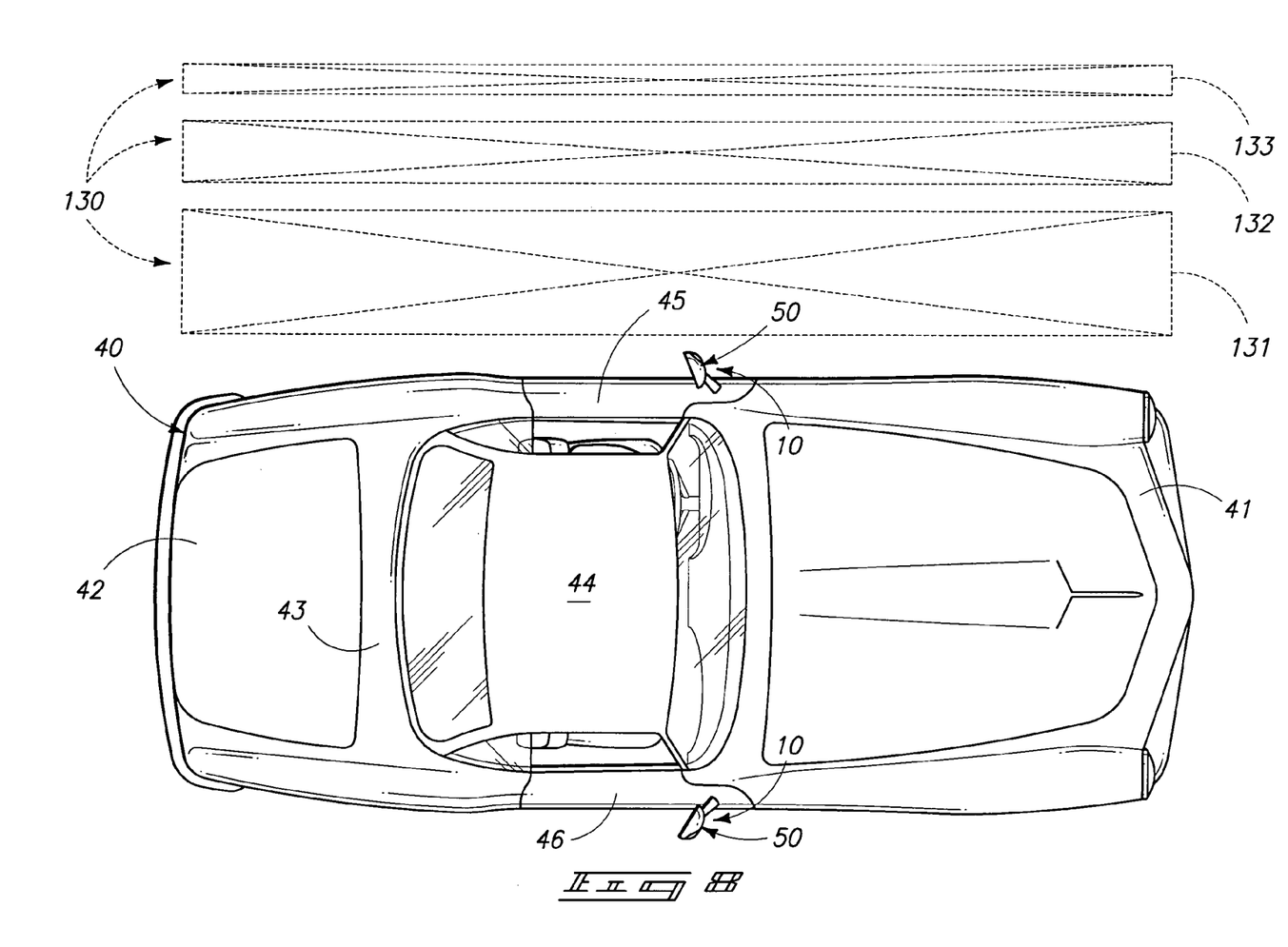
FIG. 8 is a top plan view of an overland vehicle equipped with a visual warning device of the present invention, and which is shown operating in a fourth mode.
Figure 9:
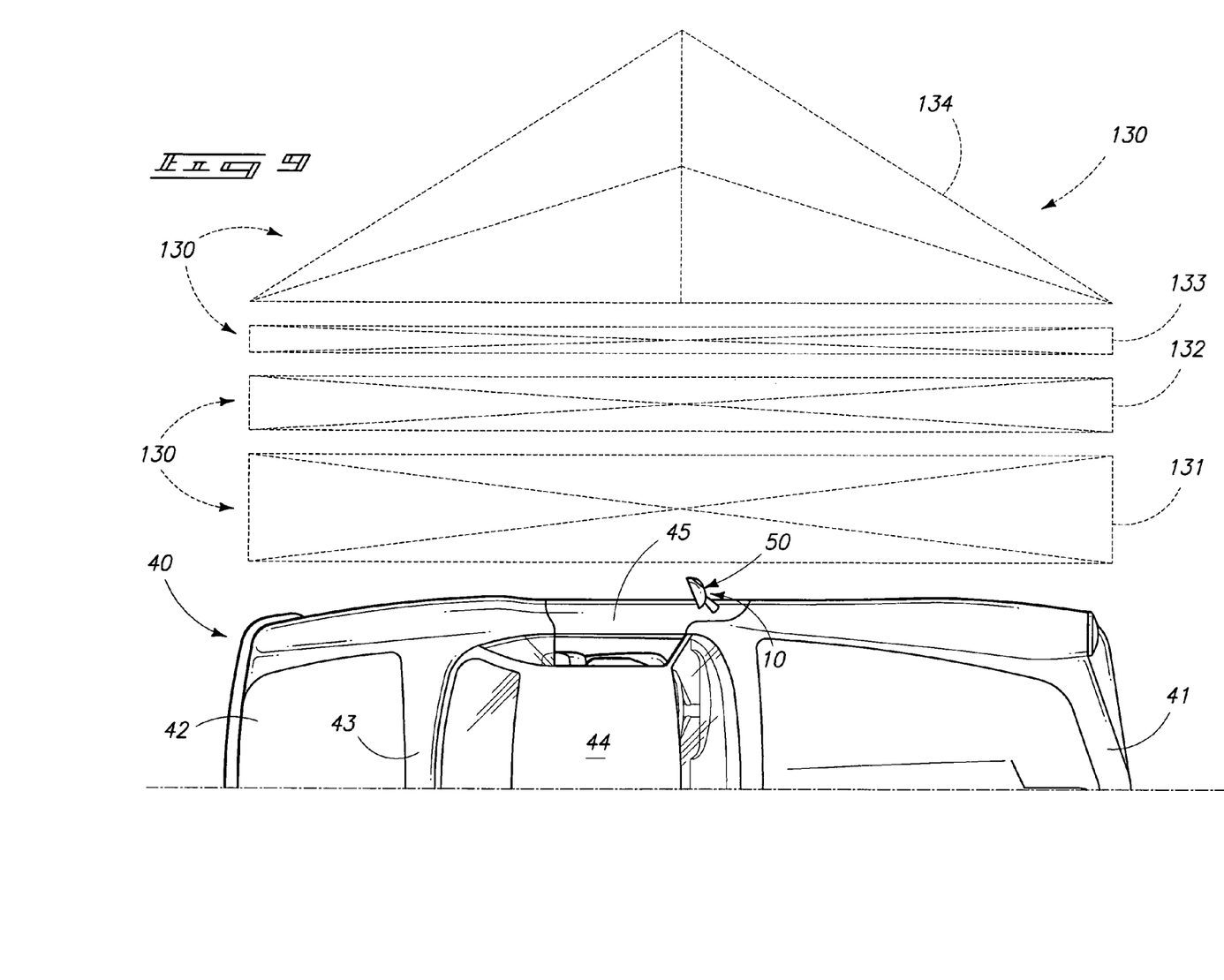
FIG. 9 is a partial top plan view of an overland vehicle equipped with a visual warning device of the present invention, and which is shown operating in a fifth mode.

Referring now to FIG. 6, and as earlier discussed, the second emitter 80 may be energized when the overland vehicle 40 is slowing, changing directions and/or stopped as seen in the various views which have been discussed, above. The emitted light of the second emitter 80 may be provided in the same color, as that supplied by the first emitter 55. Alternatively, the colors of the emitted visibly discernable light of the first and second emitters may be different colors. Further, and as earlier discussed, the visibly discernable light of the second emitter 80 may be animated as seen by a sequential study of FIGS. 6, 7, 8 and 9, respectively which show several different modes of operation. As seen therein, and in the animated mode of operation, the restricted region 33 as seen in FIG. 1 is formed by the sequential illumination of individual portions 130 of the restricted region 33. Animation may be performed by sequential illumination of patterns, sweeping of patterns, or by changing the curvature of lines or the proportions of shapes, among other techniques. For example, and referring now to FIG. 6, a first portion 131 (FIG. 6) may be illuminated by the invention 10 as shown. Shortly after the illumination of the first portion 131; a second portion 132 may then be illuminated as seen in FIG. 7. Shortly thereafter, a third portion 133 may be illuminated; followed shortly thereafter by a fourth portion 134 which is substantially triangularly shaped as seen in FIG. 9. The control unit 72 is operable to thereafter repeat the illumination of the individual portions 130, thereby rendering the restricted region animated. As should be understood, the invention 10 is also operable to illuminate all the portions 131–134 substantially simultaneously.

OPERATION

The operation of the described embodiment of the present invention is believed to be readily apparent and is briefly summarized at this point.

As seen in FIG. 1, and following, a visual warning device 10 of the present invention includes an emitter of visibly discernible light 31, 80 which is positioned in spaced relation relative to an underlying supporting surface 12, and which, when energized, emits visibly discernible light 32, 81 which is projected onto the underlying supporting surface to identify a restricted region 33, which is positioned in spaced relation relative to the emitter. As seen in FIG. 1, and following, the underlying supporting surface may be a roadway 13, and the emitter 31 is positioned upon a deployable support assembly 20 which rests upon a region of the underlying surface 14 which is adjacent to the roadway 13. As seen in FIG. 2 and following, the emitter 80 of visibly discernible light is borne by an overland vehicle 40, and which, when energized, emits visibly discernible light 81 which is projected laterally outwardly, and downwardly, onto an underlying supporting surface to identify the restricted region 33 which is adjacent to the overland vehicle 40. As seen in FIG. 4, it should be understood that the overland vehicle 40 has a main body 43, and a chassis, and wherein the emitter of visible light 121 is mounted on the main body and/or chassis. Referring now to FIG. 3, and in another form of the invention, it is understood that the overland vehicle 40 has a roof 44, and the emitter 111 of visibly discernable light is mounted on the roof of the overland vehicle. As seen in FIGS. 10–13, it will be understood that the overland vehicle has a mirror housing 51 mounted thereon, and in one form of the invention, the emitter 80 is mounted within the mirror housing such as seen in FIGS. 10 and 12, respectively. As seen by reference to FIGS. 11 and 13, the invention includes a mirror housing 51 which defines a cavity 52, and a semitransparent mirror 53 is borne by the mirror housing and is operable to pass visibly discernable light. In the arrangement as seen in those views, the second emitter 80 is borne by the mirror housing, and positioned within the cavity 52 of the mirror housing, and the visible light 81 which is emitted by the emitter, passes through the semitransparent mirror and onto the underlying supporting surface 12. As earlier discussed, the semitransparent mirror 53 is selected from the group comprising electrochromic; dichroic; and substantially neutrally chromatic mirrors.

As presently conceived, the present visual warning device 10 is typically energized during periods of low ambient light such as during periods of darkness. Still further, the invention is operable to energize the second emitter 80 when the overland vehicle 40 is slowing, changing directions, and/or stopped. As seen by reference to FIGS. 6–9, the emitter 80 is operable to be selectively, continuously energized, or energized in a pattern so as to provide animation, as earlier discussed. The visible light 81 provided by the second emitter 80 is operable to outline a geometric FIG. 33 which may include alphanumeric characters. As noted earlier, the visibly discernable light 81 provided by the second emitter 80 may comprise a single color, or may have multiple colors. As presently conceived, the second emitter 80 comprises an eye-safe laser, or a light emitting diode having an appropriate lumen output in order to provide the operational features of the invention as earlier described. As discussed, the visual warning device 10 may include assemblies such as a line generator or optical pattern generator or other lenses, diffraction media, beam splitters, oscillating and/or spinning mirrors, and prisms generally indicated by the numeral 82, and which are operable to generate the projected geometric pattern or FIG. 34 on the underlying supporting surface 12.

As seen by a study of the drawings, the visible light 56 provided by the visual warning device 50 and which is generated by the first emitter 55 is operable to travel predominately laterally, outwardly relative to the overland vehicle 40 and substantially parallel to the underlying supporting surface 12. The visible light 56 of the first emitter 55 is projected beyond the length of the overland vehicle. Further, in the arrangement as seen in the drawings, the visible light 81 provided by the second emitter is not substantially projected beyond the ends of the overland vehicle, as shown. Referring now to FIG. 3, for example, the visible light 56 emitted by the first emitter 55 forms a visible signal which indicates that the overland vehicle 40 is turning in a given direction. Simultaneously with the emission of the visible light 56, the visible light emitted by the second emitter 80 forms a visibly discernable geometric FIG. 34 to define a restricted region 33 adjacent to the overland vehicle. This restricted region is to the side of the overland vehicle and typically faces in the same general direction as that indicted by the emitted visual signal provided by the first emitter 55. As presently conceived, the present invention is operable to outline a restricted region which is adjacent to and laterally outwardly relative to the overland vehicle.

The present invention therefore relates to a visual warning device 10 for an overland vehicle 40 and which includes a mirror housing 51 which is borne by the overland vehicle 40 and which defines an aperture, and an internal cavity 52. As illustrated, the semitransparent mirror 53 is borne by the mirror housing and substantially occludes the aperture. A first emitter 55 is provided, and which, when energized, produces visibly discernable light 56. The first emitter is mounted in the cavity 52 of the mirror housing, and the visibly discernable light 56 of the first emitter passes through the semitransparent mirror and travels predominately laterally outwardly and rearwardly of the overland vehicle and in a substantially parallel orientation relative to an underlying supporting surface 12 so as to be seen at a distance beyond the of the overland vehicle. As illustrated in the drawings, a second emitter 80 is provided and which is mounted in the cavity 52 of the mirror housing. The visibly discernable light 81 of the second emitter travels predominately laterally, outwardly and downwardly onto the underlying supporting surface 12 and forms a visibly discernable geometric FIG. 34 on the underlying supporting surface 12. As illustrated, the geometric figure has a length dimension which is typically less than about 4 times the length dimension of the overland vehicle 40. As seen in the drawings, the visual warning device 10 further includes a third emitter of visibly discernable light 90 which is mounted in the cavity of the mirror housing. The visibly discernable light 91 provided by the third emitter passes out of the mirror housing 51 and illuminates a region adjacent to the overland vehicle during reduced periods of visibility and/or ambient light to assist an operator of the overland vehicle when entering or exiting the vehicle 10. In the arrangement as seen in the drawings, and in certain forms of the invention, the mirror housing may define a second aperture 102, 103 and wherein the visible light 81 emitted by the second emitter passes through the second aperture to form the visibly discernable geometric FIG. 33. In another form of the invention, the visibly discernable light provided by the second and third emitters may each pass through the semitransparent mirror. This is seen most clearly by reference to FIG. 13. As earlier discussed, the invention is operable to use various optical devices such as line generators and optical pattern generators 82 in order to provide the illuminated geometric pattern as discussed.

Therefore, it will be seen that the present invention provides a convenient means whereby an operator of an overland vehicle, or a law enforcement officer, construction worker, or the like, may illuminate a portion of an underlying supporting surface such as a roadway 13 to provide a visual warning to oncoming drivers regarding a restricted region which should be avoided as they drive. The present visual warning device provides numerous other advantages over the prior art techniques and teachings utilized heretofore, and provides a convenient means whereby overland vehicles may be operated with a higher degree of safety then what has been possible to date.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A visual warning device for an overland vehicle comprising:
    a mirror housing borne by the overland vehicle, and which defines an aperture and an internal cavity;
    a first emitter of visibly discernible light mounted within the cavity, and which, when energized, emits visibly discernible light;
    a second emitter of visibly discernible light mounted within the cavity, and which, when energized emits visibly discernible light;
    an optical assembly mounted within the cavity and which receives the emitted visibly discernible light provided by the second emitter; and
    a semitransparent mirror borne by the mirror housing and which substantially occludes the aperture, and wherein the visible light emitted by the first emitter passes through the semitransparent mirror and travels laterally outwardly relative to the overland vehicle, and the visible light emitted by the second emitter and which is provided to the optical assembly passes out of the mirror housing and travels laterally outwardly and downwardly relative to the overland vehicle to project a visibly discernible and moving geometric figure onto an underlying substantially horizontal supporting surface which is adjacent to the overland vehicle.

2. A visual warning device as claimed in claim 1, and wherein the visible light emitted by the second emitter passes through the semitransparent mirror.

3. A visual warning device as claimed in claim 1, and wherein a second aperture is formed in the mirror housing, and wherein the visible light emitted by the second emitter passes through the second aperture.

4. A visual warning device as claimed in claim 1, and wherein the first and second emitters are energized substantially simultaneously.

5. A visual warning device as claimed in claim 1, and wherein the first and second emitters are individually selectively energized.

6. A visual warning device as claimed in claim 1, and wherein the visible light emitted by the first and second emitters is substantially the same color.

7. A visual warning device as claimed in claim 1, and wherein the visible light emitted by the first and second emitters are different colors.

8. A visual warning device as claimed in claim 1, and wherein the visible light generated by the first emitter travels predominately laterally outwardly relative to the overland vehicle and substantially parallel to the underlying substantially horizontal supporting surface, and wherein the visible light of the first emitter is projected beyond at least one of the ends of the overland vehicle, and wherein the visible light generated by the second emitter is not substantially projected beyond the ends of the overland vehicle.

9. A visual warning device as claimed in claim 1, and wherein the second emitter is energized solely during periods of reduced visibility.

10. A visual warning device as claimed in claim 1, and wherein the semitransparent mirror is selected from the group comprising electrochromic, dichroic, and substantially neutrally chromatic mirrors.

11. A visual warning device as claimed in claim 1 and wherein the second emitter comprises an eye-safe laser.

12. A visual warning device as claimed in claim 1, and wherein the second emitter comprises a light emitting diode.

13. A visual warning device as claimed in claim 1, and wherein the optical assembly comprises:
    a line generator which is operably optically coupled with the second emitter and which receives the visibly discernible light which is generated by the second emitter.

14. A visual warning device as claimed in claim 1, and wherein the optical assembly comprises:
    an optical pattern generator which is operably optically coupled with the second emitter and which receives the visibly discernible light which is generated by the second emitter.

15. A visual warning device as claimed in claim 14, and wherein the optical pattern generator is selected from the group comprising a lens; a diffraction media; a beam splitter; and oscillating and/or spinning mirror; a prism; and a digital micromirror device.

* * * * *